(12) United States Patent
Kageyama et al.

(10) Patent No.: US 11,059,439 B2
(45) Date of Patent: Jul. 13, 2021

(54) IN-VEHICLE POWER SUPPLY DEVICE

(71) Applicant: Panasonic Intellectual Property Management Co., Ltd., Osaka (JP)

(72) Inventors: Youichi Kageyama, Fukushima (JP); Kazuo Takenaka, Fukushima (JP); Yugo Setsu, Fukushima (JP); Hisao Hiragi, Saitama (JP); Katsunori Atago, Fukushima (JP); Takashi Higashide, Fukushima (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 59 days.

(21) Appl. No.: 16/616,075

(22) PCT Filed: Jun. 7, 2018

(86) PCT No.: PCT/JP2018/021793
§ 371 (c)(1),
(2) Date: Nov. 22, 2019

(87) PCT Pub. No.: WO2018/230424
PCT Pub. Date: Dec. 20, 2018

(65) Prior Publication Data
US 2020/0086814 A1    Mar. 19, 2020

(30) Foreign Application Priority Data

Jun. 12, 2017 (JP) .............................. JP2017-114890

(51) Int. Cl.
*B60R 16/033* (2006.01)
*H02H 7/18* (2006.01)
(Continued)

(52) U.S. Cl.
CPC ............. *B60R 16/033* (2013.01); *H02H 7/18* (2013.01); *H02J 7/0063* (2013.01); *H02J 9/061* (2013.01); *H02J 2007/0067* (2013.01)

(58) Field of Classification Search
CPC ........ B60R 16/033; B60R 16/03; H02H 7/18; H02J 7/0063; H02J 9/061;
(Continued)

(56) References Cited

U.S. PATENT DOCUMENTS

2015/0001926 A1*  1/2015  Kageyama .............. E05B 81/86
                                                          307/10.1
2017/0033594 A1    2/2017  Rozman et al.

FOREIGN PATENT DOCUMENTS

WO        2013/125170        8/2013

OTHER PUBLICATIONS

Extended European Search Report dated Feb. 11, 2020 for the related European Patent Application No. 18818072.3.
(Continued)

*Primary Examiner* — Toan T Vu
(74) *Attorney, Agent, or Firm* — McDermott Will & Emery LLP

(57) ABSTRACT

An in-vehicle power supply device according to the present disclosure includes an input terminal, a charge-discharge circuit connected to the input terminal, a first output terminal connected to the charge-discharge circuit via a first switch unit and a first cut-off unit, a second output terminal connected to the charge-discharge circuit via a second switch unit and a second cut-off unit, and a controller connected to the input terminal, the first output terminal, and the second output terminal. The controller controls the charge-discharge circuit, the first switch unit, the first cut-off unit, the second switch unit, and the second cut-off unit. When the controller detects that a voltage of the first output terminal becomes
(Continued)

lower than the first load threshold voltage, the first cut-off unit changes from a connected state to a cut-off state. After a lapse of a first predetermined period following a time at which the controller detects that the voltage of the first output terminal is lower than the first load threshold voltage, the second switch unit switches from a state of higher-resistance conduction to a state of lower-resistance conduction in which a resistance level is lower than the resistance level in the state of higher-resistance conduction.

8 Claims, 5 Drawing Sheets

(51) Int. Cl.
*H02J 7/00* (2006.01)
*H02J 9/06* (2006.01)

(58) Field of Classification Search
CPC .......... H02J 2007/0067; H02J 2310/46; H02J 2310/40; H02J 7/0029; H02J 1/00; H02J 7/00; H02J 9/06
See application file for complete search history.

(56) References Cited

OTHER PUBLICATIONS

International Search Report of PCT application No. PCT/JP2018/021793 dated Jul. 3, 2018.

\* cited by examiner

IN-VEHICLE POWER SUPPLY DEVICE

CROSS-REFERENCE TO RELATED APPLICATIONS

This application is a U.S. national stage application of the PCT International Application No. PCT/JP2018/021793 filed on Jun. 7, 2018, which claims the benefit of foreign priority of Japanese patent application No. 2017-114890 filed on Jun. 12, 2017, the contents all of which are incorporated herein by reference.

TECHNICAL FIELD

The present disclosure relates to an in-vehicle power supply device used in a vehicle of every type.

BACKGROUND ART

Conventional in-vehicle power supply device 1 will be described below with reference to a drawing. FIG. 6 is a circuit block diagram illustrating a configuration of a conventional in-vehicle power supply device. In-vehicle power supply device 1 has electricity storage unit 2, fuse 3, and fuse 4. Electricity storage unit 2 is connected to automotive battery 5. Fuse 3 is connected to load 6. Fuse 4 is connected to load 7. Although not illustrated, electric power is supplied from automotive battery 5 to load 6 and load 7.

In-vehicle power supply device 1 operates to supply electric power from electricity storage unit 2 to loads 6 and 7 if the supply of electric power from automotive battery 5 to loads 6 and 7 is cut off due to an event such as an accident. Fuse 3 and fuse 4 are disposed to prevent an outflow of a short-circuit current from electricity storage unit 2 in response to a case such as the occurrence of a ground fault in load 6 or load 7. Fuse 3 and fuse 4 are disposed to cut off a path between electricity storage unit 2 and load 6 or a path between electricity storage unit 2 and load 7 and let a large amount of electricity remain in electricity storage unit 2 when a current higher than a predetermined current value flows to any of fuse 3 and fuse 4 owing to an event such as the occurrence of a ground fault in load 6 or load 7.

It should be noted that, for example, PTL 1 is known as a traditional art document containing information related to the invention in this application.

CITATION LIST

Patent Literature

PTL 1: WO 2013/125170

SUMMARY OF THE INVENTION

An in-vehicle power supply device according to an aspect of the present disclosure includes an input terminal, a charge-discharge circuit connected to the input terminal, a first output terminal connected to the charge-discharge circuit via a first switch unit and a first cut-off unit, a second output terminal connected to the charge-discharge circuit via a second switch unit and a second cut-off unit, and a controller connected to the input terminal, the first output terminal, and the second output terminal. The controller controls the charge-discharge circuit, the first switch unit, the first cut-off unit, the second switch unit, and the second cut-off unit. If the controller detects that a voltage of the first output terminal becomes lower than the first load threshold voltage, the first cut-off unit is changed from a connected state to a cut-off state. After a lapse of a first predetermined period following a time at which the controller detects that the voltage of the first output terminal becomes lower than the first load threshold voltage, the second switch unit switches from a state of higher-resistance conduction to a state of lower-resistance conduction in which a resistance level is lower than the resistance level in the state of higher-resistance conduction.

The in-vehicle power supply device according to an aspect of the present disclosure further includes a vehicle start detector connected to the controller. The vehicle start detector receives a vehicle start signal generated at startup of a vehicle. When the controller detects the vehicle start signal, the charge-discharge circuit starts charging and subsequently performs discharging to output a voltage lower than a voltage of the input terminal to the first output terminal and the second output terminal.

In the in-vehicle power supply device according to an aspect of the present disclosure, immediately before the controller detects that the voltage of the first output terminal is lower than the first load threshold voltage, a voltage of the input terminal is higher than an input threshold voltage, the voltage of the first output terminal is higher than the first load threshold voltage, and a voltage of the second output terminal is higher than the second load threshold voltage. When the controller detects that the voltage of the first output terminal becomes lower than the first load threshold voltage, the voltage of the first output terminal is lower than the first load threshold voltage and the voltage of the second output terminal is higher than the second load threshold voltage.

The in-vehicle power supply device according to an aspect of the present disclosure includes a vehicle start detector connected to the controller. The vehicle start detector receives a vehicle start signal. When the controller detects the vehicle start signal, the voltage of the input terminal is higher than the input threshold voltage, the voltage of the first output terminal is higher than the first load threshold voltage, and the voltage of the second output terminal is higher than the second load threshold voltage.

In the in-vehicle power supply device according to an aspect of the present disclosure, after a lapse of a second predetermined period following a time at which the controller detects that a voltage of the input terminal becomes lower than an input threshold voltage, the first switch unit and the second switch unit switch from the state of higher-resistance conduction to the state of lower-resistance conduction.

The in-vehicle power supply device according to an aspect of the present disclosure further includes an emergency start detector connected to the controller. After a lapse of a second predetermined period following a time at which the emergency start detector receives an emergency start signal indicating an emergency and the controller detects the emergency start signal, the first switch unit and the second switch unit switch from the state of higher-resistance conduction to the state of lower-resistance conduction.

In the in-vehicle power supply device according to an aspect of the present disclosure, after the controller detects a vehicle start signal and the voltage of the input terminal rises above the input threshold voltage and after a lapse of a second predetermined period following a time at which the voltage of the input terminal changes from the voltage higher than the input threshold voltage to a voltage lower than the input threshold voltage, the first switch unit and the second switch unit switch from the state of higher-resistance conduction to the state of lower-resistance conduction.

In the in-vehicle power supply device according to an aspect of the present disclosure, after a lapse of a second predetermined period following a time at which the controller detects that a voltage of the input terminal becomes lower than an input threshold voltage, that the voltage of the first output terminal becomes higher than the first load threshold voltage, and that a voltage of the second output terminal becomes higher than the second load threshold voltage, the first switch unit and the second switch unit switch from the state of higher-resistance conduction to the state of lower-resistance conduction.

DESCRIPTION OF EMBODIMENT

Figure 6:
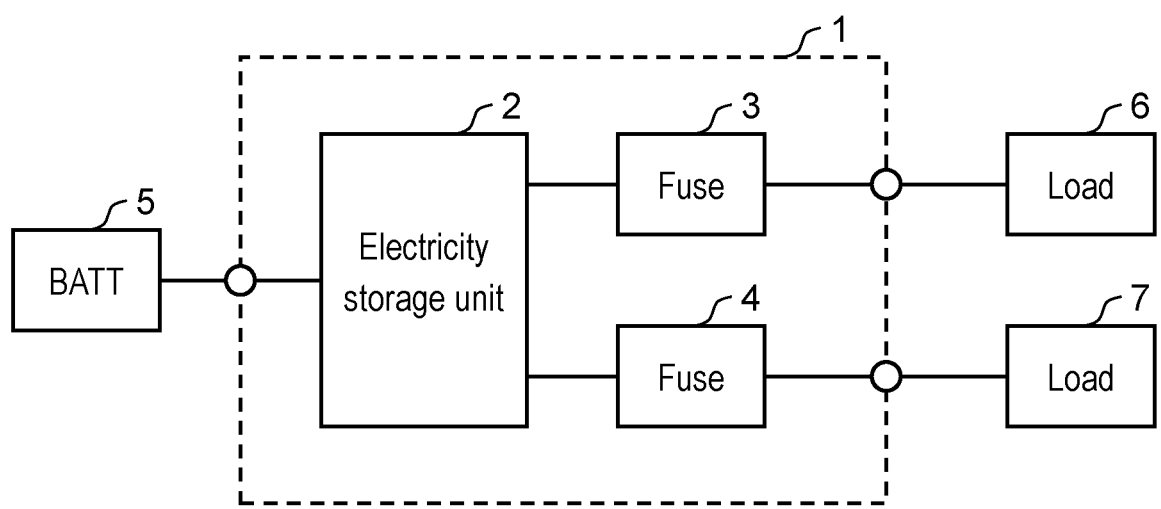
FIG. 6 is a circuit block diagram illustrating a configuration of a conventional in-vehicle power supply device.

In conventional in-vehicle power supply device 1 described with reference to FIG. 6, fuse 3 does not blow if a current lower than a predetermined current value (i.e., a current lower than a current value criterion used to blow fuse 3) is, for example, flowing from electricity storage unit 2 to load 6 because of the occurrence of an incomplete short circuit in load 6. As a result, electricity stored in electricity storage unit 2 is uselessly consumed by short-circuited load 6. This can result in a drop in electricity stored in electricity storage unit 2 before the supply of electric power from electricity storage unit 2 to load 7 through fuse 4.

It is an object of the present disclosure to reduce a loss of electricity stored in electricity storage unit 2.

An exemplary embodiment of the present disclosure will now be described with reference to the drawings.

Exemplary Embodiment

Figure 1:
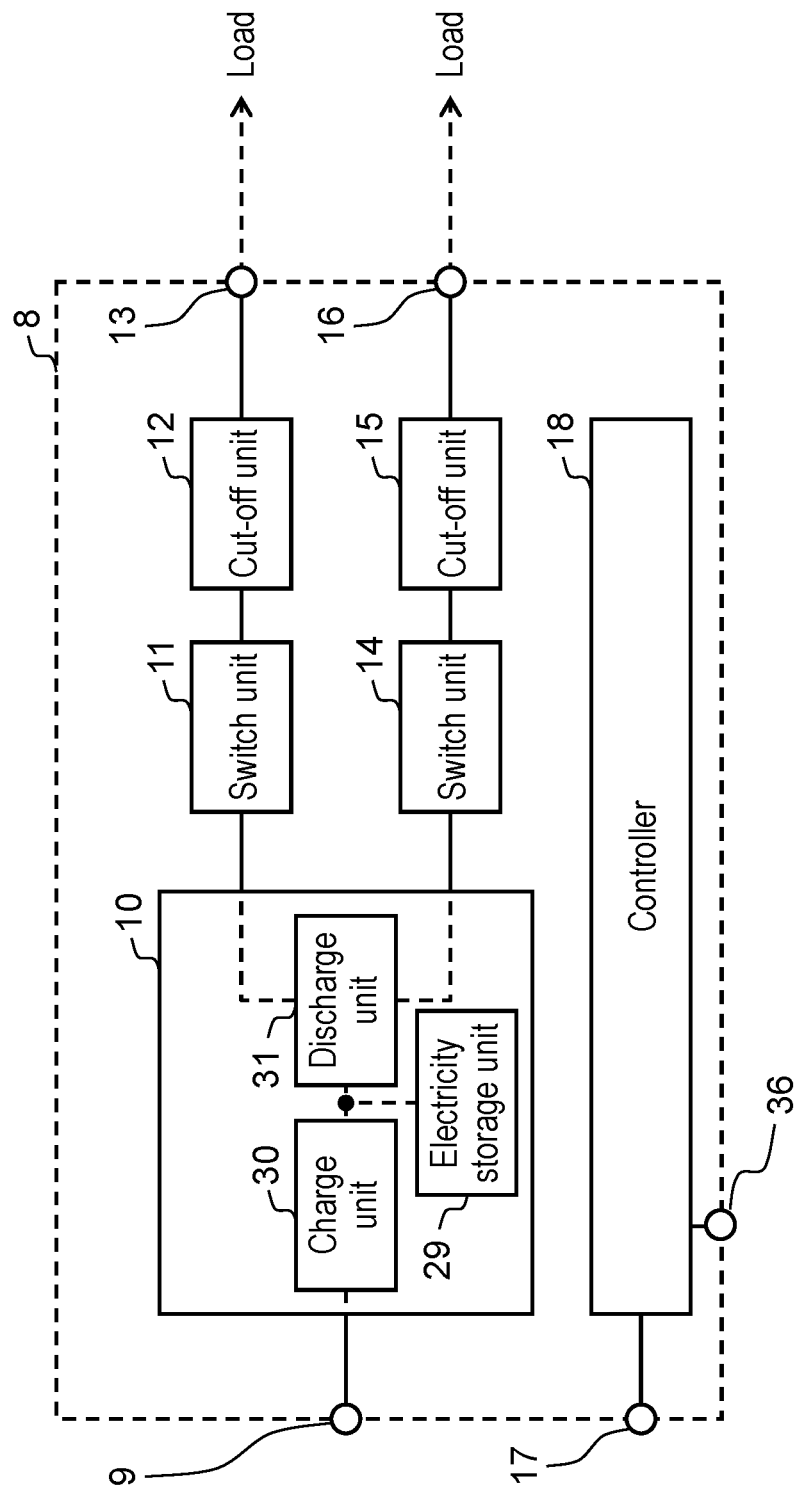
FIG. 1 is a circuit block diagram illustrating a configuration of an in-vehicle power supply device according to an exemplary embodiment of the present disclosure.

FIG. 1 is a circuit block diagram illustrating a configuration of in-vehicle power supply device 8 according to an exemplary embodiment of the present disclosure. In-vehicle power supply device 8 includes input terminal 9, charge-discharge circuit 10, first switch unit 11, first cut-off unit 12, first output terminal 13, second switch unit 14, second cut-off unit 15, second output terminal 16, and controller 18.

Figure 2:
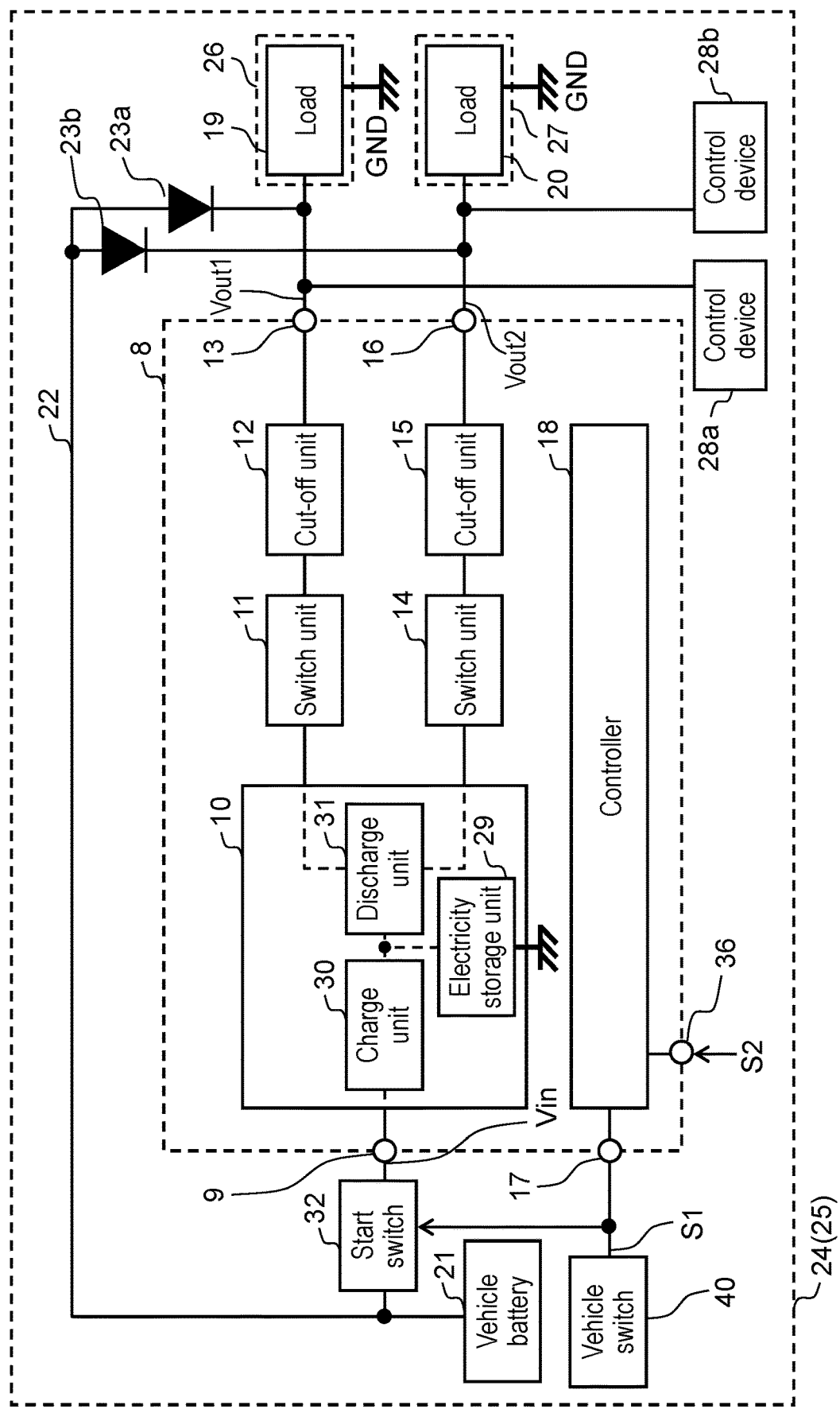
FIG. 2 is a circuit block diagram illustrating a configuration of a vehicle having the in-vehicle power supply device according to the exemplary embodiment of the present disclosure.

Input terminal 9 is connected to charge-discharge circuit 10. Charge-discharge circuit 10 is connected to first output terminal 13 via first switch unit 11 and first cut-off unit 12. Charge-discharge circuit 10 is also connected to second output terminal 16 via second switch unit 14 and second cut-off unit 15. In FIGS. 1 and 2, although illustration of a connection line is omitted to avoid complicated drawings, controller 18 is connected to input terminal 9, first output terminal 13, second output terminal 16, and vehicle start detector 17. Controller 18 is able to sense states of input terminal 9, first output terminal 13, second output terminal 16, and vehicle start detector 17.

Controller 18 controls operation of charge-discharge circuit 10, first switch unit 11, first cut-off unit 12, second switch unit 14, and second cut-off unit 15. Actually, controller 18 is connected to charge-discharge circuit 10, first switch unit 11, first cut-off unit 12, second switch unit 14, and second cut-off unit 15 by wires. However, in FIGS. 1 and 2, illustration of wiring for connecting controller 18 with first switch unit 11, first cut-off unit 12, second switch unit 14, and second cut-off unit 15 is omitted to avoid complicated drawings.

[Operation of In-Vehicle Power Supply Device 8]

Figure 3:
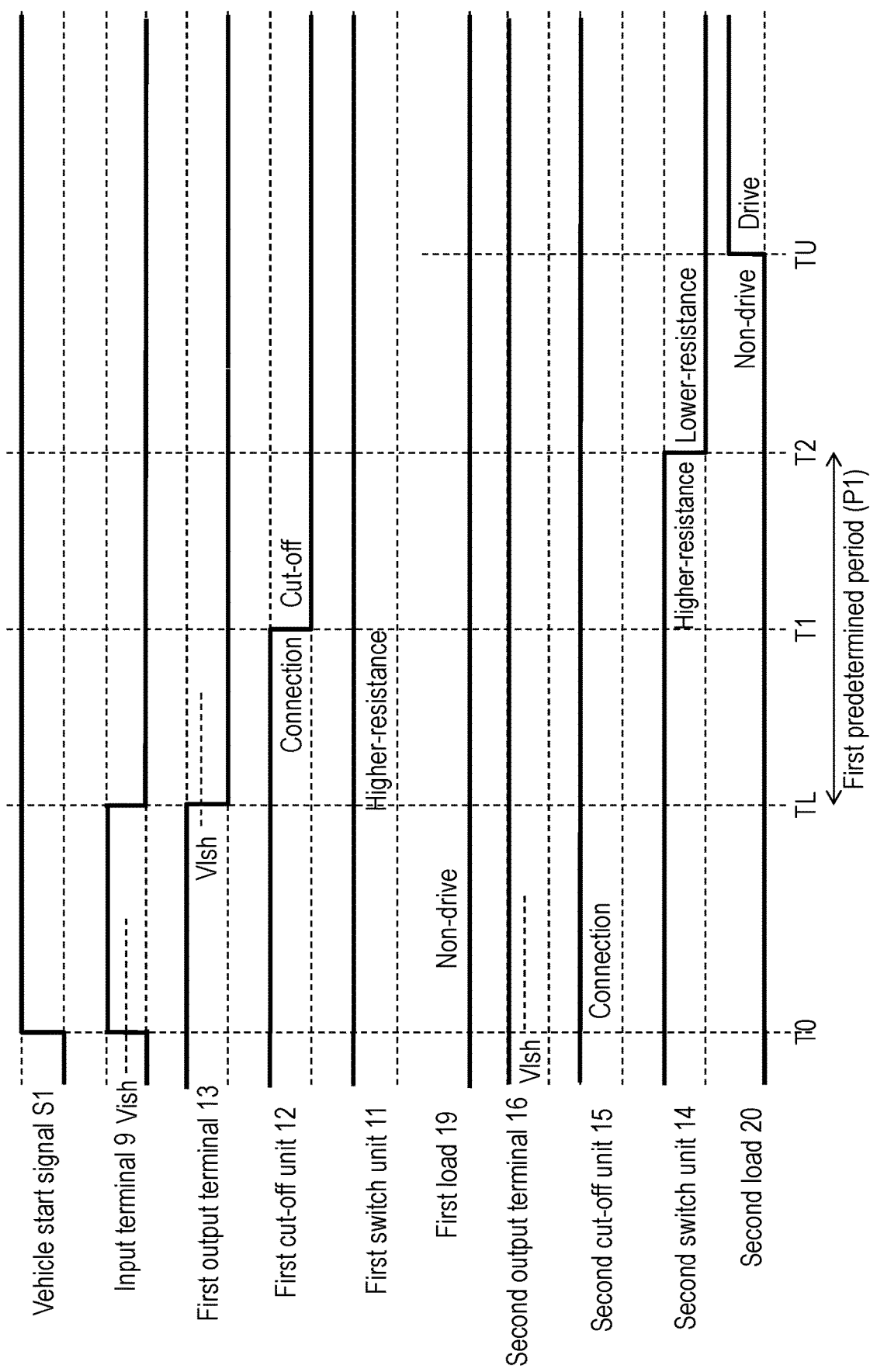
FIG. 3 is a timing chart illustrating operation of the in-vehicle power supply device according to the exemplary embodiment of the present disclosure.

With reference to FIGS. 2 and 3, operation of in-vehicle power supply device 8 will now be described. In the drawings, components similar to those in FIG. 1 are denoted by identical reference numerals, and redundant descriptions thereof may be omitted.

While vehicle 24 is properly operating, in-vehicle power supply device 8 satisfies a "normal operation power supply condition". A state in which in-vehicle power supply device 8 satisfies a "normal power supply operating condition" is a state in which vehicle battery 21 is properly supplying electric power, and vehicle battery 21 is properly connected to first load 19 and second load 20 via transmission line 22.

Next, a description is given of a case in which vehicle 24 properly operating has got into an abnormal state. First, a case where anomaly has occurred to first load 19 will be described as an example.

Vehicle 24 has properly operated until immediately before a period between time T0 and time TL on the timing chart shown in FIG. 3. While vehicle 24 is properly operating, voltage Vout1 of first output terminal 13 is maintained by electric power supplied from vehicle battery 21 via transmission line 22 and diode 23a. Similarly, voltage Vout2 of second output terminal 16 is maintained by electric power supplied from vehicle battery 21 via transmission line 22 and diode 23b.

For instance, a case where anomaly has occurred to first load 19 at time TL will be described as an example. Simultaneously with the occurrence of anomaly in first load 19, controller 18 detects that the voltage of first output terminal 13 is lower than load threshold voltage Vlsh. At this instant, first cut-off unit 12 and second cut-off unit 15 are in a connected state, and first switch unit 11 and second switch unit 14 are in a state of higher-resistance conduction. Thus, charge-discharge circuit 10 is in a state of discharging. After that, first cut-off unit 12 connected to first load 19 to which the anomaly has occurred changes from the connected state to a cut-off state (at time T1). In this example, the time (time T1) at which first cut-off unit 12 changes from the connected state to the cut-off state comes after time TL. However, time TL and time T1 may be substantially the same time.

After a lapse of first predetermined period P1 following (time TL) at which controller 18 detects that the voltage of first output terminal 13 is lower than load threshold voltage Vlsh, second switch unit 14 switches from the state of higher-resistance conduction to a state of lower-resistance conduction in which a resistance level is lower than that in the state of higher-resistance conduction (at time T2).

If the voltage detected at first output terminal 13 falls below load threshold voltage Vlsh (in other words, first load 19 connected to first output terminal 13 gets short-circuited or gets into an equivalent short circuit state), first cut-off unit 12 cuts off the supply of electric power from charge-discharge circuit 10 to first output terminal 13 (at time T1). Hence, electricity stored in charge-discharge circuit 10 does not continue to be discharged to first load 19 that is short-circuited (in an abnormal state). Charge-discharge circuit 10 does not continue to let high currents flow into first load 19. This configuration can reduce a loss of electricity stored in charge-discharge circuit 10. When the supply of electric power is needed, in-vehicle power supply device 8 is enabled to supply electric power to second load 20 (a load in a normal state) via second output terminal 16. Thus, in-vehicle power supply device 8 is able to supply electric power over a long time.

The scope of first load 19 described above includes, for example, a circuit connected to the load as well as a load function. Thus, a state in which first load 19 gets short-circuited or gets into an equivalent short circuit state, which is represented herein, includes a case in which the circuit connected to the load gets short-circuited or gets into an equivalent short circuit state. The same applies to second load 20.

With reference to FIGS. 2 and 3, the operation of in-vehicle power supply device 8 will now be described in more detail.

When vehicle switch 40 is turned on, vehicle switch 40 outputs vehicle start signal S1 indicating the start of vehicle 24. Vehicle start signal S1 is input into in-vehicle power supply device 8 via vehicle start detector 17. In in-vehicle power supply device 8, controller 18 detects vehicle start signal S1 (at time T0). Vehicle start detector 17 is not limited in configuration and shape, and may be a circuit block or a terminal. Vehicle start detector 17 may be a simple conductor connected to controller 18.

At time T0 when controller 18 detects vehicle start signal S1 output from vehicle switch 40, controller 18 detects voltage Vin of input terminal 9. Controller 18 also detects Vout1, a voltage of first output terminal 13, and Vout2, a voltage of second output terminal 16. At the same time, vehicle start signal. S1 is also input into start switch 32, and start switch 32 is turned on, so that electric power is supplied from vehicle battery 21 to charge-discharge circuit 10 via input terminal 9. In other words, at time T0, charge-discharge circuit 10 starts charging. After the start of charging, charge-discharge circuit 10 starts discharging. Charge-discharge circuit 10 applies voltages to first output terminal 13 and second output terminal 16, respectively, by discharging.

At time T0, the voltage output from charge-discharge circuit 10 is lower than a voltage supplied from vehicle battery 21 to first load 19 via transmission line 22 and diode 23a. Thus, charge-discharge circuit 10 is operating but is not supplying electric power to first load 19. In other words, charge-discharge circuit 10 is not supplying electric power to first load 19 via first output terminal 13. As a result, at time T0, voltage Vout1 detected at first output terminal 13 reflects a potential difference between first load 19 and ground GND created by electric power that is supplied from vehicle battery 21, which is connected to input terminal 9, to first load 19 via transmission line 22 and diode 23a. It should be noted that first load 19 is connected to first output terminal 13.

The same is applied to second load. 20 as with first load. 19, although description is omitted herein. At time T0, voltage Vout2 detected at second output terminal 16 reflects a potential difference between second load 20 and ground GND created by electric power that is supplied from vehicle battery 21, which is connected to input terminal 9, to second load 20 via transmission line 22 and diode 23b. It should be noted that second load 20 is connected to second output terminal 16.

At time T0, the supply of electric power in vehicle 24 that includes in-vehicle power supply device 8 is in a normal state. Concurrently, controller 18 detects vehicle start signal S1. Voltage Vin of input terminal 9 is higher than input threshold voltage Vish. The voltage (voltage Vout1) detected at first output terminal 13 is higher than load threshold voltage Vlsh. The voltage (voltage Vout2) detected at second output terminal 16 is higher than load threshold voltage Vlsh.

The state in which the supply of electric power from vehicle battery 21 to first load 19 and second load 20 is enabled as described above is a state in which the "normal power supply operating condition" is satisfied. More specifically, in a state where controller 18 detects vehicle start signal S1 input into vehicle start detector 17, electric power is allowed to be supplied from vehicle battery 21 to first and second loads 19 and 20. In a state where controller 18 detects a condition in which voltage Yin of input terminal 9 is higher than input threshold voltage Vish, electric power is allowed to be supplied from vehicle battery 21 to first and second loads 19 and 20. In a case where controller 18 detects both vehicle start signal S1 and the condition in which voltage Yin of input terminal 9 is higher than input threshold voltage Vish, electric power is allowed to be supplied from vehicle battery 21 to first and second loads 19 and 20.

The state in which the "normal power supply operating condition" is satisfied may be a case in which controller 18 detects that voltage Yin of input terminal 9 is higher than input threshold voltage Vish and that both voltages of first output terminal 13 and second output terminal 16 are higher than load threshold voltage Vlsh.

The operation of in-vehicle power supply device 8 according to the present disclosure will be described below with a specific example taken. In this example, vehicle body 25 of vehicle 24 has left door 26 and right door 27. A description is given with proviso that a door lock open-close circuit and a door lock open-close mechanism installed in left door 26 constitute first load 19 and that a door lock open-close circuit and a door lock open-close mechanism installed in right door 27 constitute second load 20. First load 19 and second load 20 may be disposed reversely in the respective right and left doors. One of first and second loads 19 and 20 may be made up of a door lock open-close circuit and a door lock open-close mechanism that are installed in a front door (not shown), and the other of first and second loads 19 and 20 may be made up of a door lock open-close circuit and a door lock open-close mechanism that are installed in a rear door (not shown).

Control device 28a for first load 19 and control device 28b for second load 20 are disposed. In other words, a control device (control device 28a or control device 28b) is disposed for every door. The door lock open-close mechanisms of first and second loads 19 and 20 are switched on and driven by commands sent from control devices 28a and 28b, respectively.

A description will now be given of a case in which first load 19 gets damaged and shorted to ground owing to a collision between a left side surface of vehicle 24 and another vehicle (not shown) at time TL. The breakage of first load 19 may be attributed to a collision with an obstacle, for example, other than the collision with the other vehicle.

At time TL when the collision with the other vehicle happens, controller 18 detects that voltage Vout1 of first output terminal 13 is lower than load threshold voltage Vlsh.

For the period from time T0 to time TL, the in-vehicle power supply device is in a state in which vehicle start signal S1 is detected by controller 18 and voltage Vin of input terminal 9 is higher than input threshold voltage Vish. In other words, the in-vehicle power supply device is in a state in which the "normal power supply operating condition" is satisfied. At time TL, controller 18 detects the occurrence of a change from the state in which the "normal power supply operating condition" is satisfied to a state in which voltage Vout1 of first output terminal 13 is lower than load threshold voltage Vlsh. The operation of in-vehicle power supply device 8 at and after time TL will be described as a "first operation".

<Description of First Operation>

With reference to FIG. 3, a first operation will be described below. First, at time TL when controller 18 detects the occurrence of a change from the state in which the "normal power supply operating condition" is satisfied to a state in which voltage Vout1 of first output terminal 13 is lower than load threshold voltage Vlsh, first load 19 remains energized, and thus charge-discharge circuit 10 starts supplying electric power to first load 19. In other words, charge-discharge circuit 10 starts discharging at time TL. At this instant, first cut-off unit 12 and second cut-off unit 15 are in a connected state. First switch unit 11 and second switch unit 14 are in a state of higher-resistance conduction. First and second cut-off units 12 and 15 remain in the connected state from prior to time TL.

At time T1 after time TL when controller 18 detects the occurrence of a change from the state in which the "normal power supply operating condition" is satisfied to the state in which voltage Vout1 of first output terminal 13 is lower than load threshold voltage Vlsh, controller 18 gets first cut-off unit 12 to switch from the connected state to a cut-off state. Controller 18 may get first cut-off unit 12 to switch from the connected state to the cut-off state at the same time as controller 18 detects that voltage Vout1 of first output terminal 13 is lower than load threshold voltage Vlsh.

For the period from time TL to time T1, electric power is discharged from first output terminal 13 to first load 19. However, because first switch unit 11 is in a state of higher-resistance conduction during this period, an amount of the electric power discharged from charge-discharge circuit 10 is low. Naturally, it is preferred that the period from time TL to time T1 is short. For the period from time TL to time T1, controller 18 may again detect a voltage that is applied across first output terminal 13 owing to electric power discharged from charge-discharge circuit 10 to sense a state of first load 19.

In other words, when first load 19 gets shorted to ground at time TL, vehicle battery 21 is also grounded, and the output voltage of vehicle battery 21 and voltage Vin of input terminal 9 apparently get lower than load threshold voltage Vlsh in an instant. In contrast to this, if controller 18 detects voltage Vout1 that is applied across first output terminal 13 owing to electric power discharged from charge-discharge circuit 10, controller 18 is able to detect and determine a level of voltage Vout1 of first output terminal 13 for a certain period of time rather than for a moment.

Electric power discharged from charge-discharge circuit 10 is output both to first output terminal 13 and second output terminal 16. This enables controller 18 to accurately determine which of first load 19 or second load 20 is shorted to ground.

Further, for the period from time TL to time T1, controller 18 may again detect a voltage that is applied across first output terminal 13 owing to electric power discharged from charge-discharge circuit 10 to sense a state of first load 19 a second time.

At time T2, which is after time T1 and after a lapse of first predetermined period P1 following time TL, second switch unit 14 switches from the state of higher-resistance conduction to the state of lower-resistance conduction. Resistance to a flow of direct current in any of first switch unit 11 and second switch unit 14 is lower in the state of lower-resistance conduction than in the state of higher-resistance conduction. It is preferred that in the state of lower-resistance conduction, the resistance to a flow of direct current be close to 0.

During first predetermined period P1, charge-discharge circuit 10 is in operation to output electric power since the supply of electric power through transmission line 22 is shut off due to a ground fault. Thus, second output terminal 16 is allowed to continuously output voltage Vout2. At and after time T2 when second switch unit 14 switches from the state of higher-resistance conduction to the state of lower-resistance conduction, second output terminal 16 is able to output a high amount of electric power. Since second output terminal 16 is able to output a high amount of electric power at time T2, a switch (not shown) disposed in second load 20 is turned on in response to a command sent from control device 28b at time TU after time T2 and the door lock open-close circuit starts driving a motor (not shown) on electric power supplied from second output terminal 16 to enable unlocking of a door lock.

In the meantime, the supply of electric power from vehicle battery 21 to second load 20 is intermittent and in an unstable state. Hence, a power supply route for the supply of electric power from vehicle battery 21 to second load 20 via transmission line 22 and diode 23b may coexist with a power supply route for the supply of electric power from charge-discharge circuit 10 to second load 20. The timing chart shown in FIG. 3 according to this exemplary embodiment is based on an assumption that vehicle 24 has an accident at time TL. Preferably, many power supply routes to second load 20 exist. In this case, a rectifier element (not shown) may be disposed in charge-discharge circuit 10, second switch unit 14, and second cut-off unit 15 to ensure that no current flows in a direction from second output terminal 16 toward charge-discharge circuit 10.

As it is clear from the description given above, the operation of in-vehicle power supply device 8 for the period from time T0 to time T2, particularly during the period from time TL to time T2 (first predetermined period P1), ensures that the output of electric power from first output terminal 13 connected to short-circuited first load 19 is cut off in a short time following the occurrence of the short circuit. Until the output from first output terminal 13 is cut off, only low electric power is output from first output terminal 13. First output terminal 13 continues the output of low and reduced electric power during first predetermined period P1, and after first predetermined period P1, second switch unit 14 switches from the state of higher-resistance conduction to the state of lower-resistance conduction so that second output terminal 16 is allowed to output high electric power.

In other words, during first predetermined period P1 after the occurrence of the ground fault, in-vehicle power supply device 8 drives minimum required control device 28b disposed outside in-vehicle power supply device 8 by low electric power, and after a lapse of first predetermined period P1 second output terminal 16 is allowed to output high electric power. After first output terminal 13 is shut off, second output terminal 16 is often required to output high electric power.

The in-vehicle power supply device according to this exemplary embodiment is able to reduce a loss of electricity stored in charge-discharge circuit 10 even if a short circuit occurs in first load 19. If electric power for operation is needed, in-vehicle power supply device 8 can supply electric power to second load 20 in a normal state via second output terminal 16. Consequently, in-vehicle power supply device 8 is able to supply electric power over a long time.

The first operation of in-vehicle power supply device 8 in response to the occurrence of anomaly in first load 19 has been described above.

<Description of Second Operation>

Next, a second operation of in-vehicle power supply device 8 will be described. In-vehicle power supply device 8 may conduct the second operation separately from the first operation described above.

The second operation is an operation conducted by in-vehicle power supply device 8 when an "emergency power supply operating condition" is satisfied. This example assumes the occurrence of a breakdown in vehicle battery 21 as the "emergency power supply operating condition".

Figure 4:
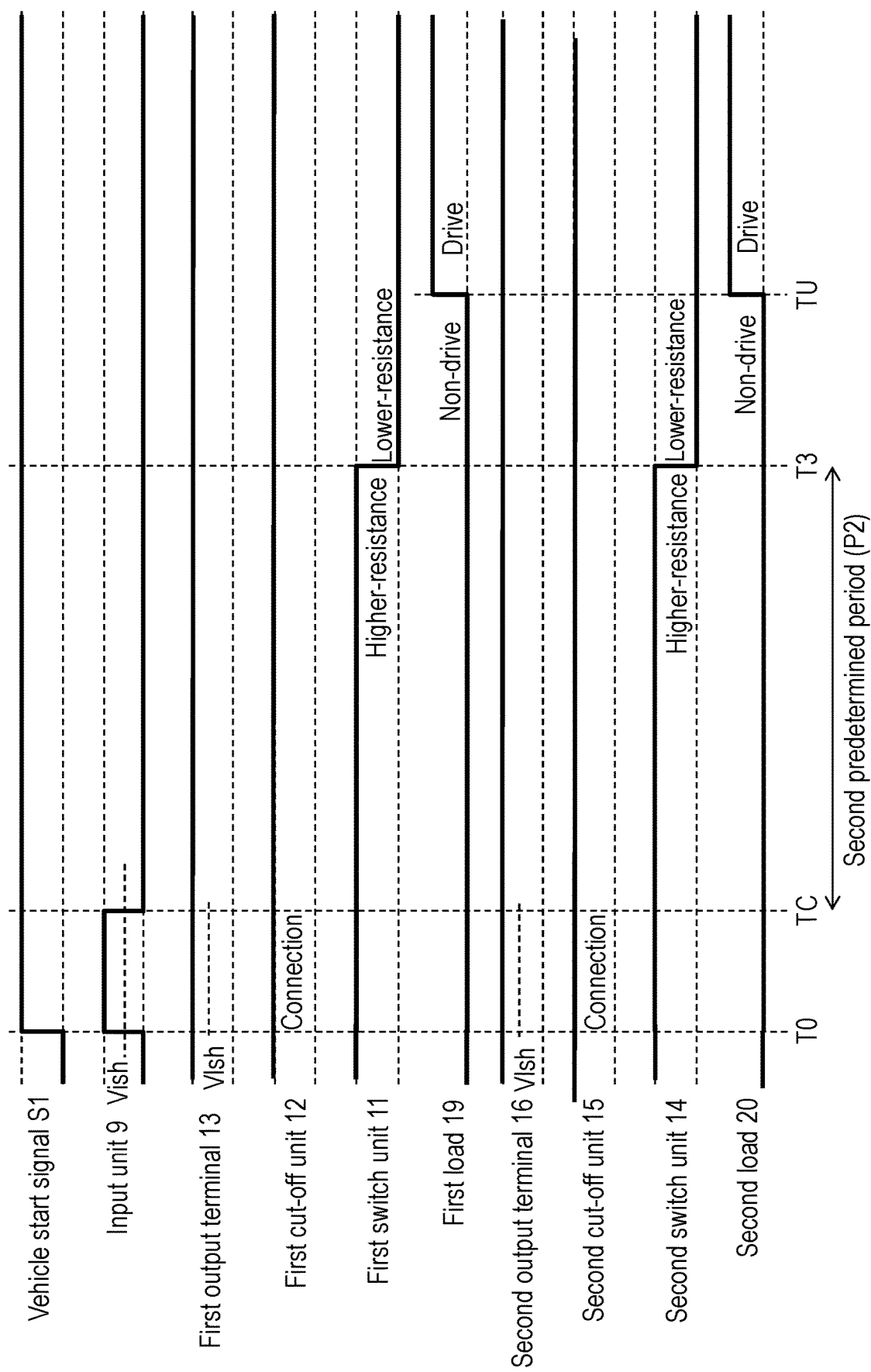
FIG. 4 is a timing chart illustrating operation of the in-vehicle power supply device according to the exemplary embodiment of the present disclosure.

With reference to FIG. 4, the second operation of in-vehicle power supply device 8 will be described in detail. FIG. 4 is a timing chart illustrating the second operation of in-vehicle power supply device 8.

The operation performed from time T0 to time TC is the same as the first operation described with reference to FIG. 3. Thus, a description thereof is omitted herein.

At time TC, the "emergency power supply operating condition" is satisfied. In this example, vehicle battery 21 gets broken at time TC. The supply of electric power from vehicle battery 21 stops and voltage Vin of input terminal 9 falls below input threshold voltage Vish. At this instant, in in-vehicle power supply device 8, first cut-off unit 12 and second cut-off unit 15 are in a connected state. With first switch unit 11 and second switch unit 14 being in a state of higher-resistance conduction, charge-discharge circuit 10 is discharging. After a lapse of second predetermined period P2 following the time at which controller 18 detects that voltage Vin of first input terminal 9 is lower than input threshold voltage Vish, first and second switch units 11 and 14 switch from the state of higher-resistance conduction to a state of lower-resistance conduction in which a resistance level is lower than that in the state of higher-resistance conduction (at time T3).

A description will be given of an assumed case in which vehicle 24 collides with another vehicle (not shown) or an obstacle (not shown) outside vehicle 24 at time TC and vehicle battery 21 and other parts get broken, for example. The "emergency power supply operating condition" is satisfied when vehicle battery 21 has got into a faulty state or is likely to have got into a faulty state.

At time T0, vehicle start signal S1 is already detected by controller 18 and the in-vehicle power supply device satisfies the "normal operation power supply condition" in which start switch 32 is switched on. In other words, vehicle 24 is properly operating. At the same time, voltage Vin of input terminal 9 is higher than input threshold voltage Vish.

After that, controller 18 detects that voltage Vin of input terminal 9 is lower than input threshold voltage Vish (at time TC). In other words, when the supply of electric power from vehicle battery 21 is shut off despite a start command given to vehicle 24, the controller determines that in-vehicle power supply device 8 satisfies the "emergency power supply operating condition".

At this instant, as described with reference to FIG. 3, if first load 19 is short-circuited and energized, charge-discharge circuit 10 starts discharging to supply electric power to second load 20. Meanwhile, as shown in FIG. 4, if power supply from the vehicle battery is in a faulty state and first and second loads 19 and 20 are not short-circuited, charge-discharge circuit 10 discharges but outputs a lower amount of electric power than electric power supplied via transmission line 22. At time TC, charge-discharge circuit 10 continues in a dischargeable state from immediately after time T0.

At time TC, first cut-off unit 12 and second cut-off unit 15 are in a connected state. First switch unit 11 and second switch unit 14 are in a state of higher-resistance conduction. First and second cut-off units 12 and 15 remain in the connected state from prior to time TC. First and second cut-off units 12 and 15 may change from a cut-off state to the connected state at time TC. First and second switch units 11 and 14 remain in the state of higher-resistance conduction from prior to time TC.

At time T0, vehicle start signal S1 is input into start switch 32, and start switch 32 is switched on. Concurrently, the voltage of input terminal 9 is higher than input threshold voltage Vish. After that, controller 18 detects that the voltage of input terminal 9 is lower than input threshold voltage Vish (at time TC). At time T3 after a lapse of second predetermined period P2 following time TC, first and second switch units 11 and 14 switch from the state of higher-resistance conduction to the state of lower-resistance conduction.

As described above, due to the breakdown of vehicle battery 21, charge-discharge circuit 10 is required to output electric power for the period from time T0 to time T3 (particularly during the period from time TC to time T3). During second predetermined period P2, since first and second switch units 11 and 14 are in the state of higher-resistance conduction, charge-discharge circuit 10 outputs low and reduced electric power to first and second output terminals 13 and 16. However, at time T3 after a lapse of second predetermined period P2, first and second switch units 11 and 14 switch from the state of higher-resistance conduction to the state of lower-resistance conduction. As a result, after time T3, first and second output terminals 13 and 16 are allowed to output high electric power.

In other words, during second predetermined period P2 following time TC at which a fault occurs in vehicle battery 21, in-vehicle power supply device 8 drives control devices 28a, 28b disposed outside in-vehicle power supply device 8 by low electric power. At and after time T3 following a lapse of second predetermined period P2, in-vehicle power supply device 8 is allowed to output high electric power. An end of second predetermined period P2 is set before a point (in this example, time TU) at which high electric power is needed.

This example assumes that the first load and the second load need to start running at time TU after time T3. For instance, first load 19 and second load 20 each include a door lock open-close circuit and a motor (not shown). In this case, the motor driven by the door lock open-close circuit starts running at time TU to enable unlocking of a door lock at and after time TU.

At and after time TU, first and second switch units 11 and 14 are in the state of lower-resistance conduction and hence first and second loads 19 and 20 are allowed to run owing to high electric power supplied from charge-discharge circuit 10 to first and second output terminals 13 and 16. As a result, unlocking of the door lock, which requires high electric power, can be performed.

During second predetermined period P2, first switch unit 11 is in the state of higher-resistance conduction and thus charge-discharge circuit 10 is enabled to supply low electric power to first load 19 via first output terminal 13. During second predetermined period P2, second switch unit 14 is in the state of higher-resistance conduction and thus charge-discharge circuit 10 is enabled to supply low electric power to second load 20 via second output terminal 16. As described with reference to FIG. 3, if voltage Vout1 of first output terminal 13 falls below load threshold voltage Vlsh, controller 18 determines that a ground fault has occurred to first load 19. As shown with the period from time TL to time T2 in FIG. 3, controller 18 lets first cut-off unit 12 change into the cut-off state and is thus able to reduce the consumption of electricity in charge-discharge circuit 10. In this case, controller 18 lets second switch unit 14 switch from the state of higher-resistance conduction to the state of lower-resistance conduction at time T3 so that charge-discharge circuit 10 starts supplying electric power to second output terminal 16 at time T3.

Although a description is omitted herein, a similar process is executed if voltage Vout2 of second output terminal 16 falls below load threshold voltage Vlsh, so that charge-discharge circuit 10 starts supplying electric power to first output terminal 13 at time T3.

This configuration allows charge-discharge circuit 10 to maintain stored electricity without waste.

The "emergency power supply operating condition" described above is an example case in which controller 18 detects the occurrence of a change from a state in which vehicle start signal S1 is detected by controller 18, start switch 32 is switched on, and the voltage of input terminal 9 is higher than input threshold voltage Vish to a state in which the voltage of input terminal 9 is lower than input threshold voltage Vish. However, the "emergency power supply operating condition" is not limited to this example case.

[Another Example of "Emergency Power Supply Operating Condition"]

For instance, in-vehicle power supply device 8 further includes emergency start detector 36 connected to controller 18. The controller may determine that an "emergency power supply operating condition" is satisfied when emergency start detector 36 receives emergency start signal S2 that is generated by a vehicle controller (not shown) inside vehicle 24. When emergency start signal S2 received by emergency start detector 36 is input into controller 18, controller 18 determines that the "emergency power supply operating condition" is satisfied. Emergency start signal S2 is a signal generated in response to the occurrence of an emergency in vehicle 24.

Emergency start signal S2 may be received while vehicle 24 is in operation at and after time T0. Emergency start signal S2 may be received even during a suspension of the operation of vehicle 24 before time T0, with proviso that charge-discharge circuit 10 is in a dischargeable state.

[Another Example of "Emergency Power Supply Operating Condition"]

Another situation in which an "emergency power supply operating condition" is satisfied will be described below. Controller 18 may determine that the "emergency power supply operating condition" is satisfied when controller 18 detects that the voltage of input terminal 9 is lower than input threshold voltage Vish and that both voltages of first output terminal 13 and second output terminal 16 are higher than load threshold voltage Vlsh.

When vehicle 24 starts operating at time T0, charge-discharge circuit 10 supplies a voltage that is lower than a voltage of vehicle battery 21 in a normal state to first output terminal 13 and second output terminal 16. If vehicle battery 21 is normal, charge-discharge circuit 10 does not output electric power due to a potential difference. When vehicle battery 21 discontinues the supply of electric power due to a breakdown or other failure at time TC, charge-discharge circuit 10 supplies electric power both to first and second output terminals 13 and 16. If controller 18 detects that both voltages of first and second output terminals 13 and 16 are higher than load threshold voltage Vlsh at this instant, controller 18 can determine that first load 19 and second load 20 are not shorted to ground. At the same time, when the controller detects that the voltage of input terminal 9 is lower than input threshold voltage Vish, controller 18 can determine that vehicle battery 21 is broken.

Controller 18 illustrated in this exemplary embodiment is disposed as an independent element or a functional part inside in-vehicle power supply device 8. However, functions related to control and detection possessed by controller 18 may be partly possessed by other parts such as charge-discharge circuit 10, first cut-off unit 12, second cut-off unit 15, first switch unit 11, and second switch unit 14 as needed. If parts such as first cut-off unit 12, second cut-off unit 15, first switch unit 11, and second switch unit 14 possess a function as a controller, a portion of parts such as first cut-off unit 12, second cut-off unit 15, first switch unit 11, and second switch unit 14 can be regarded as a controller.

As shown in FIGS. 1 and 2, charge-discharge circuit 10 includes electricity storage unit 29, charge unit 30, and discharge unit 31. Charge unit 30 is disposed on an input charging route between electricity storage unit 29 and input terminal 9. Discharge unit 31 is disposed on an output discharging route between electricity storage unit 29 and first and second output terminals 13 and 16. Electric power for driving controller 18 is supplied from electricity storage unit 29 or both electricity storage unit 29 and vehicle battery 21.

Controller 18 detects vehicle start signal. S1 via vehicle start detector 17.

Vehicle start signal S1 is output from start switch 32 (such as an engine switch or an ignition switch) disposed in vehicle 24. Vehicle start signal. S1 may be a signal emitted during startup of vehicle 24. The generation of vehicle start signal S1 can be in conjunction with a voltage produced at startup of vehicle 24 by being in synchronization or conjunction with start switch 32 (such as an engine switch or an ignition switch) disposed in vehicle 24. Start switch 32 may be configured to be switched on while vehicle start signal S1 is generated.

In this exemplary embodiment, voltage Vout1 of first output terminal 13 and voltage Vout2 of second output terminal 16 are compared with same load threshold voltage Vlsh. However, voltage Vout1 of first output terminal 13 and voltage Vout2 of second output terminal 16 may be compared with different load threshold voltages.

[Configuration Example of Switch Units and Cut-Off Units]

Figure 5:
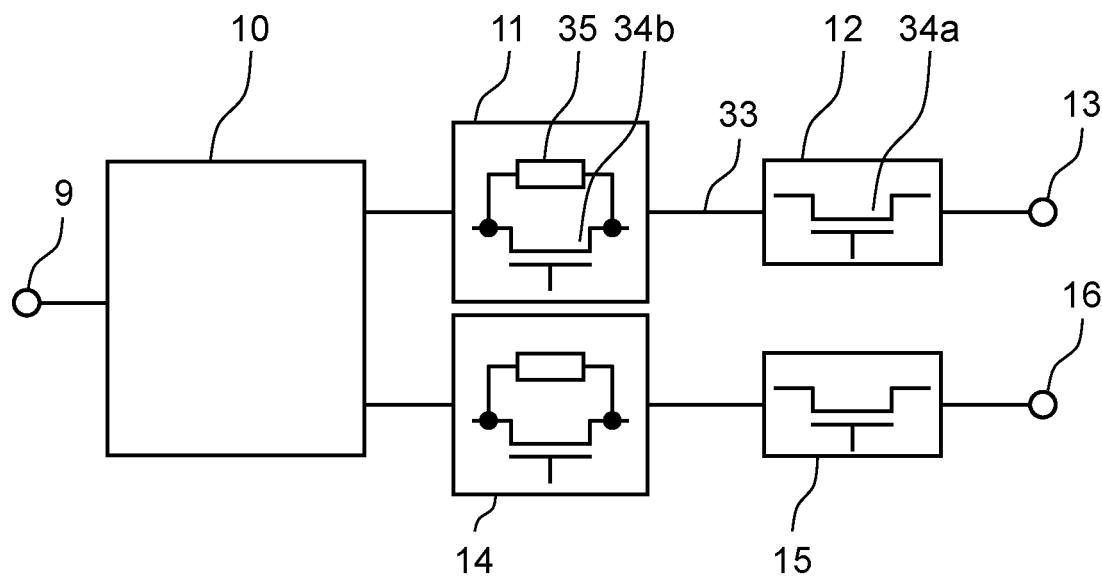
FIG. 5 is a circuit block diagram illustrating a part of the in-vehicle power supply device according to the exemplary embodiment.

With reference to FIG. 5, a configuration example of first switch unit 11, first cut-off unit 12, second switch unit 14, and second cut-off unit 15 will now be described.

As shown in FIG. 5, first cut-off unit 12 may be switching element 34a connected in series with discharge path 33. This configuration allows any of first cut-off unit 12 and second cut-off unit 15 to switch between the connected state and the cut-off state. Since a configuration of second cut-off unit 15 is the same as the configuration of first cut-off unit 12, a description thereof is omitted.

First switch unit 11 may include switching element 34b and resistor 35 that are connected in parallel with discharge path 33. Owing to this configuration, first switch unit 11 is in the state of lower-resistance conduction if switching element 34a is in a connected state and is in the state of higher-resistance conduction if switching element 34a is in a cut-off state. Since a configuration of second switch unit 14 is the same as the configuration of first switch unit 11, a description thereof is omitted.

Switching element 34a and switching element 34b are not necessarily identical switching elements and may be switching elements having different properties.

In the present exemplary embodiment described with reference to FIGS. 3 and 4, voltage Vout1 of first output terminal 13 has been higher than load threshold voltage Vlsh since before time T0. However, voltage Vout1 of first output terminal 13 may be set higher than load threshold voltage Vlsh at any time (e.g., time T0) in a time range starting from time T0.

First cut-off unit 12 and second cut-off unit 15 have been in the connected state since before time T0. However, first and second cut-off units 12 and 15 may be put into the connected state at any time (e.g., time T0) in a time range starting from time T0.

First switch unit 11 and second switch unit 14 have been in the state of higher-resistance conduction since before time T0. However, first and second switch units 11 and 14 may be put into the state of higher-resistance conduction at any time (e.g., time T0) in a time range starting from time T0.

CONCLUSION

In-vehicle power supply device 8 according to the present disclosure includes input terminal 9, charge-discharge circuit 10 connected to input terminal 9, first output terminal 13 connected to charge-discharge circuit 10 via first switch unit 11 and first cut-off unit 12, second output terminal 16 connected to charge-discharge circuit 10 via second switch unit 14 and second cut-off unit 15, and controller 18 connected to input terminal 9, first output terminal 13, and second output terminal 16. Controller 18 controls charge-discharge circuit 10, first switch unit 11, first cut-off unit 12, second switch unit 14, and second cut-off unit 15.

If controller 18 detects that voltage Vout1 of first output terminal 13 becomes lower than first load threshold voltage Vlsh, first cut-off unit 12 changes from a connected state to a cut-off state. After a lapse of first predetermined period P1 following a time at which controller 18 detects that voltage Vout1 of first output terminal 13 becomes lower than first load threshold voltage Vlsh, second switch unit 14 switches from a state of higher-resistance conduction to a state of lower-resistance conduction in which a resistance level is lower than the resistance level in the state of higher-resistance conduction.

In-vehicle power supply device 8 according to the present disclosure includes vehicle start detector 17 connected to controller 18. The vehicle start detector 17 receives vehicle start signal S1 generated at startup of vehicle 24. When controller 18 detects vehicle start signal S1, charge-discharge circuit 10 starts charging and subsequently performs discharging to output a voltage lower than voltage Vin of input terminal 9 to first output terminal 13 and second output terminal 16.

In in-vehicle power supply device 8 according to the present disclosure, immediately before controller 18 detects that the voltage of first output terminal 13 is lower than load threshold voltage Vlsh, the voltage of input terminal 9 is higher than input threshold voltage Vish, voltage Vout1 of first output terminal 13 is higher than load threshold voltage Vlsh, and voltage Vout2 of second output terminal 16 is higher than load threshold voltage Vlsh. When controller 18 detects that voltage Vout1 of first output terminal 13 becomes lower than load threshold voltage Vlsh, voltage Vout1 of first output terminal 13 is lower than load threshold voltage Vlsh and voltage Vout2 of second output terminal 16 is higher than load threshold voltage Vlsh.

In-vehicle power supply device 8 according to the present disclosure includes vehicle start detector 17 connected to controller 18. The vehicle start detector 17 receives vehicle start signal S1. When controller 18 detects vehicle start signal S1, voltage Vin of input terminal 9 is higher than input threshold voltage Vish, voltage Vout1 of first output terminal 13 is higher than load threshold voltage Vlsh, and voltage Vout2 of second output terminal 16 is higher than load threshold voltage Vlsh.

In in-vehicle power supply device 8 according to the present disclosure, after a lapse of second predetermined period. P2 following a time at which controller 18 detects that voltage Vin of input terminal 9 becomes lower than input threshold voltage Vish, first switch unit 11 and second switch unit 14 switch from the state of higher-resistance conduction to the state of lower-resistance conduction.

In-vehicle power supply device 8 according to the present disclosure further includes emergency start detector 36 connected to controller 18. After a lapse of second predetermined period P2 following a time at which emergency start detector 36 receives emergency start signal S2 indicating an emergency and controller 18 detects emergency start signal S2, first switch unit 11 and second switch unit 14 switch from the state of higher-resistance conduction to the state of lower-resistance conduction.

In in-vehicle power supply device 8 according to the present disclosure, after controller 18 detects vehicle start signal S1 and voltage Vin of input terminal 9 rises above input threshold voltage Vish and after a lapse of second predetermined period P2 following a time at which voltage Vin of input terminal 9 changes from the voltage higher than input threshold voltage Vish to a voltage lower than input threshold voltage Vish, first switch unit 11 and second switch unit 14 switch from the state of higher-resistance conduction to the state of lower-resistance conduction.

In in-vehicle power supply device 8 according to the present disclosure, after a lapse of second predetermined period P2 following a time at which controller 18 detects that the voltage of input terminal 9 is lower than input threshold voltage Vish, that the voltage of first output terminal 13 becomes higher than load threshold voltage Vlsh, and that the voltage of second output terminal 16 becomes higher than load threshold voltage Vlsh, first switch unit 11 and second switch unit 14 switch from the state of higher-resistance conduction to the state of lower-resistance conduction.

In in-vehicle power supply device 8 according to the present disclosure, if the voltage detected at the output terminal falls below the load threshold voltage, the cut-off unit, after a lapse of a certain period of time, cuts off the output of electric power from the charge-discharge circuit. Hence, electricity stored in the charge-discharge circuit does not continue to be discharged to a circuit that is short-circuited. This configuration can reduce a loss of electricity stored in the charge-discharge circuit. Consequently, when the in-vehicle power supply device is required to operate, the in-vehicle power supply device is allowed to operate over a long time.

INDUSTRIAL APPLICABILITY

An in-vehicle power supply device according to the present disclosure is able to reduce a loss of stored electricity. This technique is useful for in-vehicle power supply devices mounted in vehicles.

REFERENCE MARKS IN THE DRAWINGS

1: in-vehicle power supply device
2: electricity storage unit
3, 4: fuse
5: automotive battery
6, 7: load.
8: in-vehicle power supply device
9: input terminal
10: charge-discharge circuit
11: first switch unit
12: first cut-off unit
13: first output terminal
14: second switch unit
15: second cut-off unit
16: second output terminal
17: vehicle start detector
18: controller
19: first load
20: second load
21: vehicle battery
22: transmission line
23a, 23b: diode
24: vehicle
25: vehicle body
26: left door
27: right door
28a, 28b: control device
29: electricity storage unit
30: charge unit
31: discharge unit
32: start switch
33: discharge path
34a, 34b: switching element
35: resistor
36: emergency start detector
40: vehicle switch
P1: first predetermined period
P2: second predetermined period
S1: vehicle start signal
S2: emergency start signal
T0, TL, T1, T2, T3, TC, TU: time
Vish: input threshold voltage
Vin: voltage
Vlsh: load threshold voltage
Vout1: voltage
Vout2: voltage

The invention claimed is:

1. An in-vehicle power supply device comprising:
an input terminal;
a charge-discharge circuit connected to the input terminal;
a first output terminal connected to the charge-discharge circuit via a first switch unit and a first cut-off unit;
a second output terminal connected to the charge-discharge circuit via a second switch unit and a second cut-off unit; and
a controller connected to the input terminal, the first output terminal, and the second output terminal, the controller being configured to control the charge-discharge circuit, the first switch unit, the first cut-off unit, the second switch unit, and the second cut-off unit,
wherein the controller detects that a voltage of the first output terminal becomes lower than a first load threshold voltage, the first cut-off unit changes from a connected state to a cut-off state, and
after a lapse of a first predetermined period following a time at which the controller detects that the voltage of the first output terminal becomes lower than the first load threshold voltage, the second switch unit switches from a state of higher-resistance conduction to a state of lower-resistance conduction in which a resistance level is lower than the resistance level in the state of higher-resistance conduction.

2. The in-vehicle power supply device according to claim 1, further comprising a vehicle start detector connected to the controller, the vehicle start detector being configured to receive a vehicle start signal generated at startup of a vehicle,
wherein the controller detects the vehicle start signal, the charge-discharge circuit starts charging and subsequently performs discharging to output a voltage lower than a voltage of the input terminal to the first output terminal and the second output terminal.

3. The in-vehicle power supply device according to claim 1, wherein
immediately before the controller detects that the voltage of the first output terminal becomes lower than the first load threshold voltage, a voltage of the input terminal is higher than an input threshold voltage, the voltage of the first output terminal is higher than the first load threshold voltage, and a voltage of the second output terminal is higher than a second load threshold voltage, and
when the controller detects that the voltage of the first output terminal becomes lower than the first load threshold voltage, the voltage of the first output terminal is lower than the first load threshold voltage and the voltage of the second output terminal is higher than the second load threshold voltage.

4. The in-vehicle power supply device according to claim 3, further comprising a vehicle start detector connected to the controller, the vehicle start detector being configured to receive a vehicle start signal,
wherein when the controller detects the vehicle start signal,
the voltage of the input terminal is higher than the input threshold voltage,
the voltage of the first output terminal is higher than the first load threshold voltage, and
the voltage of the second output terminal is higher than the second load threshold voltage.

5. The in-vehicle power supply device according to claim 1, wherein after a lapse of a second predetermined period following a time at which the controller detects that a voltage of the input terminal becomes lower than an input threshold voltage, the first switch unit and the second switch unit switch from the state of higher-resistance conduction to the state of lower-resistance conduction.

6. The in-vehicle power supply device according to claim 1, further comprising an emergency start detector connected to the controller, wherein after a lapse of a second predetermined period following a time at which the emergency start detector receives an emergency start signal indicating an emergency and the controller detects the emergency start signal, the first switch unit and the second switch unit switch from the state of higher-resistance conduction to the state of lower-resistance conduction.

7. The in-vehicle power supply device according to claim 5, wherein after the controller detects a vehicle start signal and the voltage of the input terminal rises above the input threshold voltage and after a lapse of a second predetermined period following a time at which the voltage of the input terminal changes from the voltage higher than the input threshold voltage to a voltage lower than the input threshold voltage, the first switch unit and the second switch unit switch from the state of higher-resistance conduction to the state of lower-resistance conduction.

8. The in-vehicle power supply device according to claim 1, wherein after a lapse of a second predetermined period following a time at which the controller detects that a voltage of the input terminal becomes lower than an input threshold voltage, that the voltage of the first output terminal becomes higher than the first load threshold voltage, and that a voltage of the second output terminal becomes higher than the second load threshold voltage, the first switch unit and the second switch unit switch from the state of higher-resistance conduction to the state of lower-resistance conduction.

* * * * *